(12) United States Patent
Suciu et al.

(10) Patent No.: US 9,790,811 B2
(45) Date of Patent: Oct. 17, 2017

(54) GAS GENERATOR WITH MOUNT HAVING AIR PASSAGES

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 147 days.

(21) Appl. No.: 14/652,840

(22) PCT Filed: Jun. 7, 2013

(86) PCT No.: PCT/US2013/044635
§ 371 (c)(1),
(2) Date: Jun. 17, 2015

(87) PCT Pub. No.: WO2014/109788
PCT Pub. Date: Jul. 17, 2014

(65) Prior Publication Data
US 2015/0330306 A1    Nov. 19, 2015

Related U.S. Application Data

(60) Provisional application No. 61/751,062, filed on Jan. 10, 2013.

(51) Int. Cl.
| | |
|---|---|
| *F02C 7/18* | (2006.01) |
| *F01D 25/16* | (2006.01) |
| *F02C 7/32* | (2006.01) |
| *F02C 7/12* | (2006.01) |
| *F02C 7/20* | (2006.01) |

(52) U.S. Cl.
CPC .............. *F01D 25/162* (2013.01); *F02C 7/12* (2013.01); *F02C 7/20* (2013.01); *F02C 7/32* (2013.01);
(Continued)

(58) Field of Classification Search
CPC ........ F01D 15/12; F01D 25/162; F01D 25/28; F05D 2220/324; F05D 2220/325;
(Continued)

(56) References Cited

U.S. PATENT DOCUMENTS 4,641,495 A * 2/1987 Mowill .................... F02C 3/103
                                                                    415/199.1
5,443,229 A    8/1995 O'Brien et al.
(Continued)

FOREIGN PATENT DOCUMENTS

| EP | 0469827 | 2/1992 |
|---|---|---|
| EP | 0743435 A1 | 11/1996 |
| FR | 2891248 A1 | 3/2007 |

OTHER PUBLICATIONS

International Search Report and Written Opinion for PCT Application No. PCT/2013/044635, dated Oct. 8, 2013.
(Continued)

*Primary Examiner* — Marina Tietjen
*Assistant Examiner* — Paul J Gray
(74) *Attorney, Agent, or Firm* — Carlson, Gaskey & Olds, PC

(57) ABSTRACT

A gas turbine engine has a turbine section, and a housing enclosing the turbine section, with a mount structure secured to the housing for mounting and including internal flow passages for delivering air to remote locations.

20 Claims, 4 Drawing Sheets

(52) U.S. Cl.
CPC .... *F05D 2220/325* (2013.01); *F05D 2260/60* (2013.01); *Y02T 50/675* (2013.01)

(58) Field of Classification Search
CPC .......... F05D 2260/60; F02C 6/04; F02C 6/06; F02C 6/08; F02C 7/18
See application file for complete search history.

(56) References Cited

U.S. PATENT DOCUMENTS

| | | | |
|---|---|---|---|
| 5,782,077 | A | 7/1998 | Porte |
| 2007/0220900 | A1* | 9/2007 | Shockling ................ F02C 3/22 60/802 |
| 2008/0251633 | A1* | 10/2008 | Journade ................ B64D 27/26 244/54 |
| 2009/0007567 | A1 | 1/2009 | Porte et al. |
| 2011/0079019 | A1 | 4/2011 | Durocher et al. |
| 2011/0290935 | A1 | 12/2011 | Machado et al. |
| 2011/0305572 | A1* | 12/2011 | Bellis .................. B64C 11/306 416/129 |
| 2012/0298835 | A1 | 11/2012 | Noel et al. |

OTHER PUBLICATIONS

Supplementary European Search Report for European Application No. 13870696.5 dated Dec. 17, 2015.
International Preliminary Report on Patentability for International Application No. PCT/US2013/044635 dated Jul. 23, 2015.

\* cited by examiner

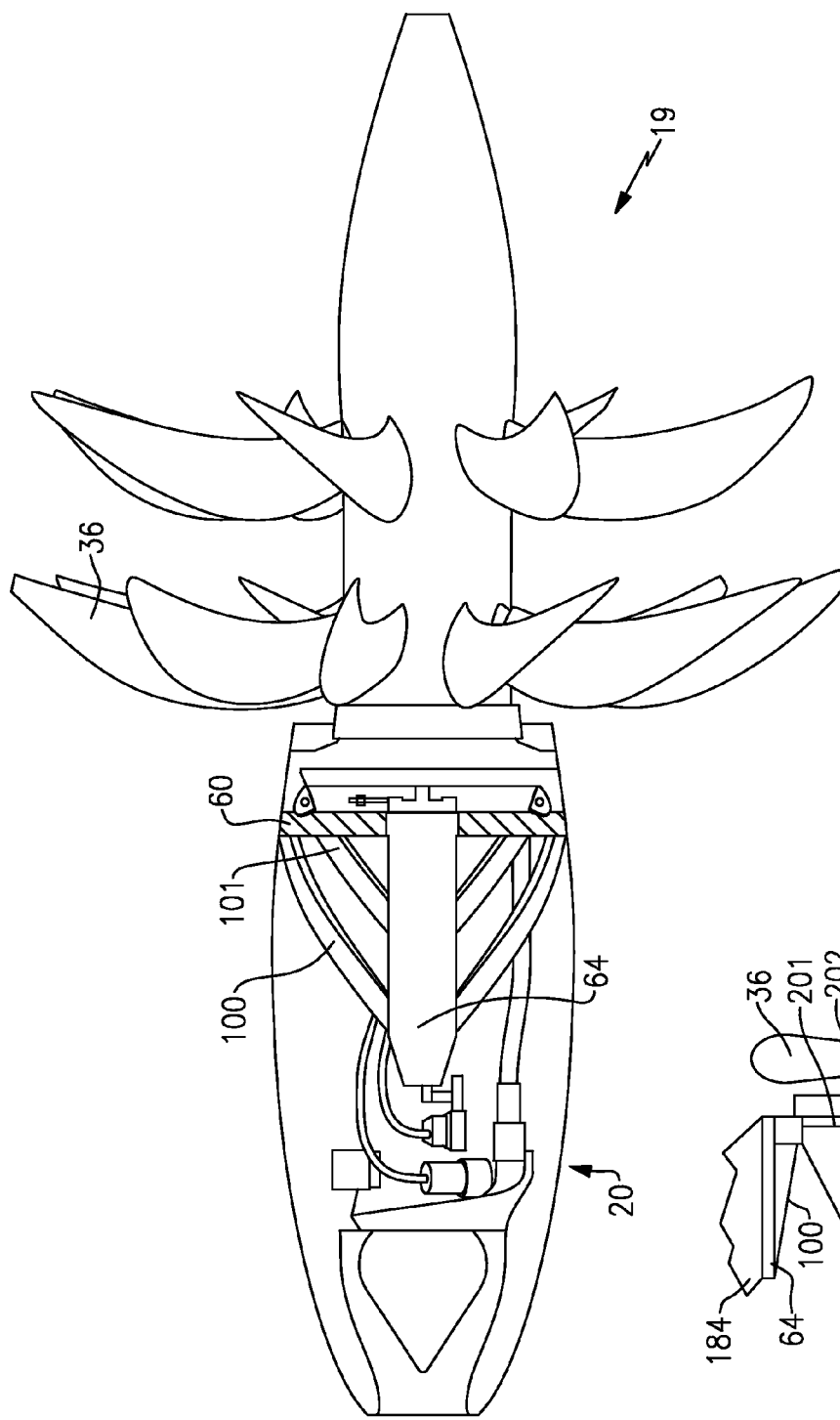
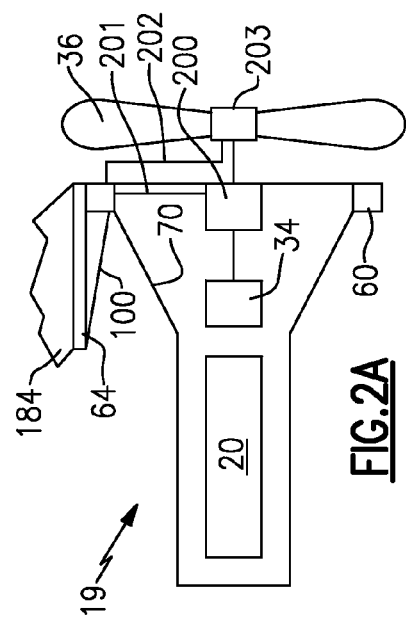
FIG.2B
FIG.2A

GAS GENERATOR WITH MOUNT HAVING AIR PASSAGES

BACKGROUND

This application relates to a mount for a gas turbine engine.

Conventional gas turbine engines typically include a fan section, a compressor section and a turbine section. There are two generally known architectures. In one architecture, a low speed spool includes a low pressure turbine driving a low pressure compressor and also driving a fan. A gear reduction may be placed between the spool and the fan in some applications. There are also engines where the fan is directly driven.

Another known architecture includes a third spool with a third turbine positioned downstream of the low pressure turbine and driving the fan. The three spools have shafts connecting a turbine to the driven element, and the three shafts are mounted about each other.

All of these architectures raise challenges.

SUMMARY

In a featured embodiment, a gas turbine engine has a turbine section, and a housing enclosing the turbine section, with a mount structure secured to the housing for mounting and including internal flow passages for delivering air to remote locations.

In another embodiment according to the previous embodiment, a turbine case is positioned downstream of the turbine section, and the mount structure is secured to an outer surface of the turbine case.

In another embodiment according to any of the previous embodiments, the mount structure is provided with a mount plate.

In another embodiment according to any of the previous embodiments, the mount plate is connected to the mount ring by a plurality of ribs.

In another embodiment according to any of the previous embodiments, the ribs are positioned on opposed circumferential sides of the mount plate.

In another embodiment according to any of the previous embodiments, air supply passages are also formed within the mount plate and at least one of the ribs.

In another embodiment according to any of the previous embodiments, air supply passages are also formed within the mount plate.

In another embodiment according to any of the previous embodiments, the air from the mount structure is delivered to a gear reduction for driving a propulsor.

In another embodiment according to any of the previous embodiments, the gear reduction is driven by a propulsor turbine, with the propulsor turbine downstream of the turbine section.

In another embodiment according to any of the previous embodiments, the mount structure is mounted intermediate the turbine section and the propulsor.

In another embodiment according to any of the previous embodiments, the air from the mount structure is delivered to a pitch control mechanism for a propeller.

In another embodiment according to any of the previous embodiments, the mount structure is mounted intermediate the turbine section and the propeller.

In another embodiment according to any of the previous embodiments, air is supplied into a port in the mount structure.

In another embodiment according to any of the previous embodiments, air is supplied into the port in the mount structure from a forward location on the gas turbine engine.

In another embodiment according to any of the previous embodiments, air from the mount structure is delivered to an environmental control system for an aircraft.

In another embodiment according to any of the previous embodiments, air is supplied into a port in the mount structure from a forward location on the gas turbine engine.

In another embodiment according to any of the previous embodiments, air from the mount structure is delivered to an environmental control system for an aircraft.

In another embodiment according to any of the previous embodiments, the mount structure is mounted intermediate the turbine section and a propulsor.

In another embodiment according to any of the previous embodiments, a first compressor rotor is upstream of a second compressor rotor with a ratio of a pressure ratio across the first compressor rotor to a pressure ratio across the second compressor rotor being greater than or equal to about 2.0.

In another embodiment according to any of the previous embodiments, the ratio is less than or equal to about 8.

BRIEF DESCRIPTION OF THE DRAWINGS

FIG. 2A schematically shows an engine.

FIG. 2B shows an engine and mount.

DETAILED DESCRIPTION

Figure 1:
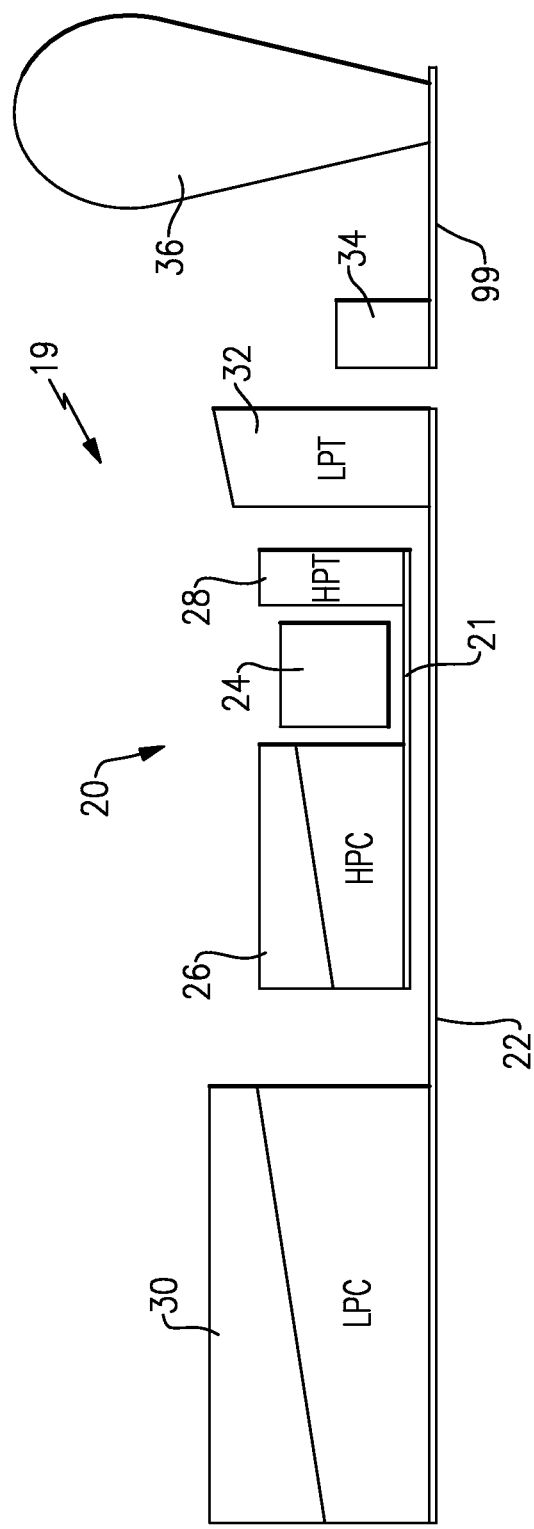
FIG. 1 schematically shows a three spool gas turbine engine.

A gas turbine engine 19 is schematically illustrated in FIG. 1. A core engine, or gas generator 20, includes high speed shaft 21 that is part of a high speed spool along with a high pressure turbine rotor 28 and a high pressure compressor rotor 26. A combustion section 24 is positioned intermediate the high pressure compressor rotor 26 and the high pressure turbine rotor 28. A shaft 22 of a low pressure spool connects a low pressure compressor rotor 30 to a low pressure turbine rotor 32.

Engine 19 also includes a free turbine 34 is shown positioned downstream of the low pressure turbine rotor 32 and serves to drive a propeller 36.

Various embodiments are within the scope of the disclosed engine. These include embodiments in which:

more work is performed by the low pressure compressor rotor 30 than by the high pressure compressor rotor 26;

the combination of a first pressure ratio through the low pressure compressor rotor 30 and a second pressure ratio through the high pressure compressor rotor 26 provides an overall pressure ratio equal to or above about 30;

the low pressure compressor rotor 30 includes eight stages and has a pressure ratio at cruise conditions of 14.5; in the illustrated embodiment, the high pressure compressor rotor 26 had six stages and an overall pressure ratio of 3.6 at cruise;

a ratio of the low pressure compressor pressure ratio to the high pressure compressor ratio is greater than or equal to about 2.0, and less than or equal to about 8.0;

more narrowly, the ratio of the two pressure ratios is between or equal to about 3.0 and less than or equal to about 8; and even more narrowly, the ratio of the two pressure ratios is greater than about 3.5.

In the above embodiments, the high pressure compressor rotor 26 rotates at slower speeds than in the prior art. If the pressure ratio through the fan and low pressure compressor are not modified, this could result in a somewhat reduced overall pressure ratio. The mechanical requirements for the high pressure spool, in any event, are relaxed.

With the lower compressor, the high pressure turbine rotor 28 may include a single stage. In addition, the low pressure turbine rotor 32 may include two stages.

By moving more of the work to the low pressure compressor rotor 30, there is less work being done at the high pressure compressor rotor 26. In addition, the temperature at the exit of the high pressure compressor rotor 26 may be higher than is the case in the prior art, without undue challenges in maintaining the operation.

Variable vanes are less necessary for the high pressure compressor rotor 26 since it is doing less work. Moreover, the overall core size of the combined compressor rotors 30 and 26 is reduced compared to the prior art.

The engine 19 has what may be called a propulsor turbine 34 which is axially downstream of the low pressure turbine rotor 32. Further, the high pressure spool radially surrounds the low pressure spool, but neither of the spools surrounds the propulsor turbine, nor the shaft 99 connecting the propulsor turbine to the propeller 36. In this sense, the propulsor rotor is separate from the gas generator portion of the engine.

The disclosed engine architecture creates a smaller core engine and yields higher overall pressure ratios and, therefore, better fuel consumption. Further, uncoupling the low pressure turbine 32 from driving prop 36 enables it to run at a lower compressor surge margin, which also increases efficiency. Moreover, shaft diameters can be decreased and, in particular, for the diameter of the low pressure shafts as it is no longer necessary to drive the prop 36 through that shaft.

In the prior art, the ratio of the low pressure compressor pressure ratio to the high pressure compressor ratio was generally closer to 0.1 to 0.5. Known three spool engines have a ratio of the low pressure compressor pressure ratio to the high pressure compressor ratio of between 0.9 and 3.0.

With the relatively small diameter core engine 20, there will be challenges in mounting the engine 19 to an aircraft. In particular, if the engine 19 was mounted as in the prior art, at front and rear locations, there would be challenges from so-called "backbone bending" due to the small diameter. Thus, as shown in FIG. 2A, a mount ring 60 is secured to a turbine case 70 that is downstream of the core engine 20. While element 60 is described as a "ring," it should be understood that other shapes would come within the teachings of this application. The turbine case 70 may also receive the propulsor turbine 34 and the gear reduction 200. The propellers 36 are downstream and beyond the turbine case. The ring 60 supplies the sole mount plane for the engine 19. A plate 64 extends forwardly from the ring 60 and includes a plurality of ribs, one of which, 100, is illustrated in FIG. 2A. An aircraft body 184 is shown schematically and is secured to the plate 64. As shown, the ring 60 has air passages 201 leading to the gear reduction 200. Cooling air may be supplied with the ring 60 being utilized as part of the cooling air supply. Further, a separate passage 202 extends from the ring 60 to a pitch control mechanism 203. Again, the air may be utilized for cooling the pitch control mechanism 203. As known, the pitch control mechanism 203 may allow changing the pitch of the propeller blades 36.

As shown in FIG. 2B, there are pairs of ribs 100 and 101 extending in opposed lateral directions and fixed between the plate 64 and the ring 60.

Figure 3:
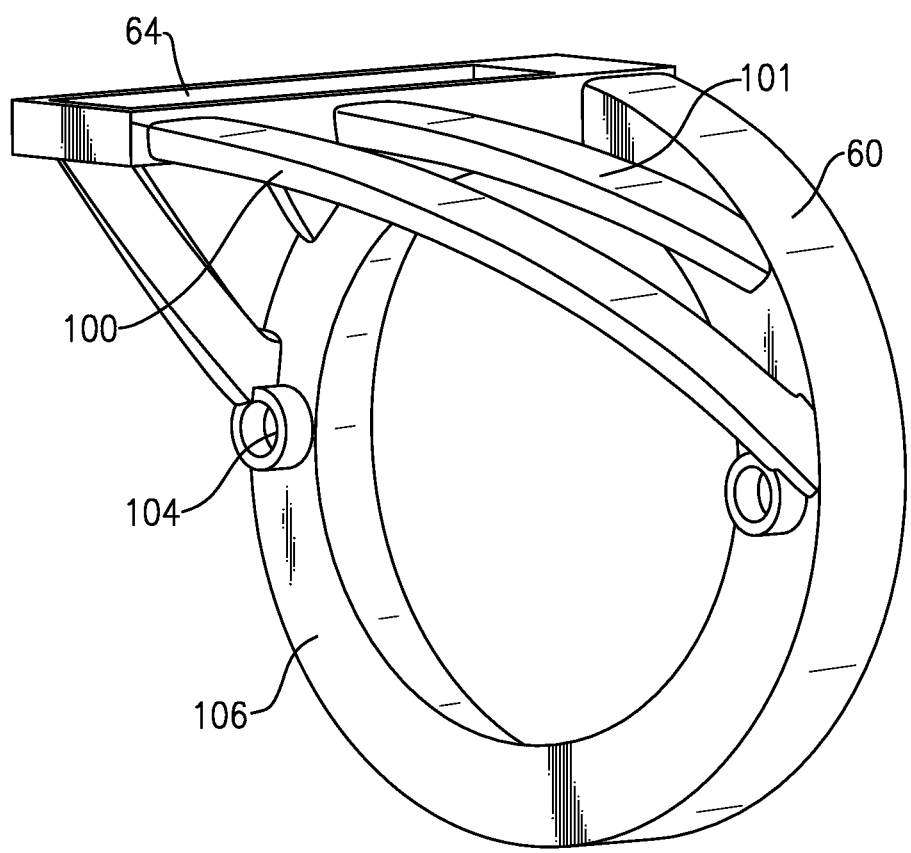
FIG. 3 shows details of the engine mount.

As shown in FIG. 3, the ring 60 includes pairs of ribs 100 and 101 connecting the ring 60 to the plate 64. The ring 60 includes ports 104 which may receive cooling air, and the air may be circulated within hollow passages within the ring 60, the ribs 100 and 101, and the plate 64. The air is circulated to be adjacent to passages, such as the passages 201 or 202 as shown in FIG. 2A. Thus, the ring 60 and plate 64 not only provide mounting structure, they also eliminate the need for additional plumbing to route air across the system.

Figure 4:
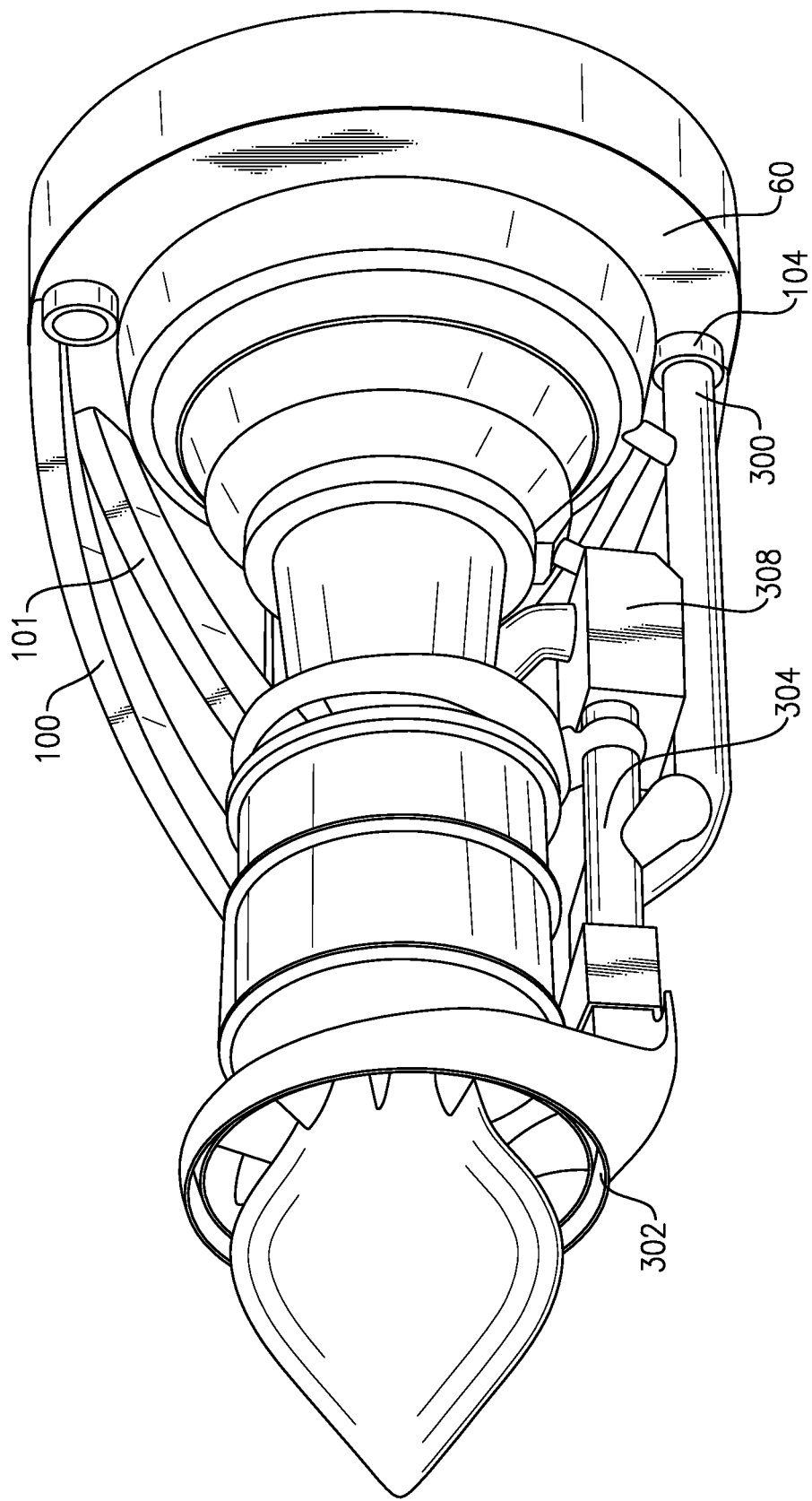
FIG. 4 shows further details.

FIG. 4 shows an embodiment wherein an air supply 302 receives air from a forward end of the engine, passes that air through a passage 304 and to a passage 300 leading into the port 104, such that the air may circulate through the ring 60. In this way, air is supplied into the ring 60, and then may be distributed as mentioned above to various components such as the gear reduction 200, or the pitch control mechanism 203.

A cabin air supply system is shown schematically at FIG. 4, and may be for use on an aircraft receiving the engine. Again, this air may pass through the ring 60 on its way to the cabin air supply system 308

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a turbine section, and a housing enclosing said turbine section, with a mount structure secured to said housing for mounting said engine, and said mount structure including internal flow passages for delivering air to remote locations;
   the air from said mount structure is delivered to a gear reduction for driving a propulsor; and
   said gear reduction being driven by a propulsor turbine, with said propulsor turbine being downstream of said turbine section.

2. The gas turbine engine as set forth in claim 1, wherein a turbine case is positioned downstream of said turbine section, and said mount structure being secured to an outer surface of said turbine case.

3. The gas turbine engine as set forth in claim 1, wherein said mount structure is provided with a mount plate.

4. The gas turbine engine as set forth in claim 3, wherein said mount plate is connected to a mount ring by a plurality of ribs.

5. The gas turbine engine as set forth in claim 4, wherein said ribs are positioned on opposed circumferential sides of said mount plate.

6. The gas turbine engine as set forth in claim 5, wherein air supply passages are also formed within said mount plate and at least one of said ribs.

7. The gas turbine engine as set forth in claim 4, wherein air supply passages are also formed within said mount plate.

8. The gas turbine engine as set forth in claim 1, wherein said mount structure is mounted intermediate said turbine section and said propulsor.

9. The gas turbine engine as set forth in claim 8, wherein the air from said mount structure is delivered to a pitch control mechanism for a propeller.

10. The gas turbine engine as set forth in claim 9, wherein said mount structure is mounted intermediate said turbine section and said propeller.

11. The gas turbine engine as set forth in claim 10, wherein air being supplied into a port in said mount structure.

12. The gas turbine engine as set forth in claim 11, wherein air is supplied into the port in said mount structure from a forward location on the gas turbine engine.

13. The gas turbine engine as set forth in claim 12, wherein air from said mount structure is delivered to an environmental control system for an aircraft.

14. The gas turbine engine as set forth in claim 1, wherein air is supplied into a port in said mount structure from a forward location on the gas turbine engine.

15. The gas turbine engine as set forth in claim 14, wherein air from said mount structure is delivered to an environmental control system for an aircraft.

16. The gas turbine engine as set forth in claim 1, further including a first compressor rotor upstream of a second compressor rotor with a ratio of a pressure ratio across said first compressor rotor to a pressure ratio across said second compressor rotor being greater than or equal to 2.0.

17. The gas turbine engine as set forth in claim 16, wherein said ratio is less than or equal to about 8.

18. A gas turbine engine comprising:
a turbine section, and a housing enclosing said turbine section, with a mount structure secured to said housing for mounting said engine, and said mount structure including internal flow passages for delivering air to remote locations;
said mount structure being provided with a mount plate;
said mount plate being connected to said mount ring by a plurality of ribs; and
air supply passages are also formed within said mount plate.

19. The gas turbine engine as set forth in claim 18, wherein the air from said mount structure is delivered to a gear reduction for driving a propulsor.

20. The gas turbine engine as set forth in claim 19, wherein said gear reduction being driven by a propulsor turbine, with said propulsor turbine being downstream of said turbine section.

* * * * *